(12) United States Patent
Sun et al.

(10) Patent No.: US 11,669,712 B2
(45) Date of Patent: Jun. 6, 2023

(54) ROBUSTNESS EVALUATION VIA NATURAL TYPOS

(71) Applicant: salesforce.com, inc., San Francisco, CA (US)

(72) Inventors: Lichao Sun, Chicago, IL (US); Kazuma Hashimoto, Menlo Park, CA (US); Jia Li, Mountain View, CA (US); Richard Socher, Menlo Park, CA (US); Caiming Xiong, Menlo Park, CA (US)

(73) Assignee: salesforce.com, inc., San Francisco, CA (US)

(*) Notice: Subject to any disclaimer, the term of this patent is extended or adjusted under 35 U.S.C. 154(b) by 845 days.

(21) Appl. No.: 16/559,196

(22) Filed: Sep. 3, 2019

(65) Prior Publication Data

US 2020/0372319 A1    Nov. 26, 2020

Related U.S. Application Data

(60) Provisional application No. 62/851,073, filed on May 21, 2019.

(51) Int. Cl.
*G06N 3/08* (2023.01)
*G06F 40/232* (2020.01)
(Continued)

(52) U.S. Cl.
CPC ........... *G06N 3/008* (2013.01); *G06F 40/232* (2020.01); *G06N 3/044* (2023.01); *G06N 3/045* (2023.01); *G06N 3/08* (2013.01)

(58) Field of Classification Search
CPC .... G06N 3/008; G06N 3/0445; G06N 3/0454; G06N 3/08; G06F 40/232; G06F 40/279
See application file for complete search history.

(56) References Cited

U.S. PATENT DOCUMENTS 10,282,663 B2   5/2019   Socher et al.
10,346,721 B2   7/2019   Mbright et al.
(Continued)

FOREIGN PATENT DOCUMENTS

WO   WO-2019246294 A1 * 12/2019   ......... G06F 16/9024

OTHER PUBLICATIONS

Belinkov et al., "Synthetic and Natural Noise both Break Neural Machine Translation," arXiv preprint arXiv:1711.02173, pp. 1-12, 2017.
(Continued)

*Primary Examiner* — Linda Wong
(74) *Attorney, Agent, or Firm* — Haynes and Boone, LLP

(57) ABSTRACT

A method for evaluating robustness of one or more target neural network models using natural typos. The method includes receiving one or more natural typo generation rules associated with a first task associated with a first input document type, receiving a first target neural network model, and receiving a first document and corresponding its ground truth labels. The method further includes generating one or more natural typos for the first document based on the one or more natural typo generation rules, and providing, to the first target neural network model, a test document generated based on the first document and the one or more natural typos as an input document to generate a first output. A robustness evaluation result of the first target neural network model is generated based on a comparison between the output and the ground truth labels.

17 Claims, 9 Drawing Sheets

(51) Int. Cl.
    *G06N 3/045*    (2023.01)
    *G06N 3/008*    (2023.01)
    *G06N 3/044*    (2023.01)

(56) References Cited

U.S. PATENT DOCUMENTS

| | | | |
|---|---|---|---|
| 10,474,709 B2 | 11/2019 | Paulus | |
| 10,521,465 B2 | 12/2019 | Paulus | |
| 10,542,270 B2 | 1/2020 | Zhou et al. | |
| 10,546,217 B2 | 1/2020 | Mbright et al. | |
| 11,429,785 B2 * | 8/2022 | Kwon | G06F 40/166 |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher | |
| 2018/0082171 A1 | 3/2018 | Merity et al. | |
| 2018/0096219 A1 | 4/2018 | Socher | |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0143966 A1 | 5/2018 | Lu et al. | |
| 2018/0144208 A1 | 5/2018 | Lu et al. | |
| 2018/0144248 A1 | 5/2018 | Lu et al. | |
| 2018/0268287 A1 | 9/2018 | Johansen et al. | |
| 2018/0268298 A1 | 9/2018 | Johansen et al. | |
| 2018/0300317 A1 | 10/2018 | Bradbury | |
| 2018/0336198 A1 | 11/2018 | Zhong et al. | |
| 2018/0336453 A1 | 11/2018 | Merity et al. | |
| 2018/0349359 A1 | 12/2018 | McCann et al. | |
| 2018/0373682 A1 | 12/2018 | McCann et al. | |
| 2018/0373987 A1 | 12/2018 | Zhang et al. | |
| 2019/0130206 A1 | 5/2019 | Trott et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0130897 A1 | 5/2019 | Zhou et al. | |
| 2019/0188568 A1 | 6/2019 | Keskar et al. | |
| 2019/0213482 A1 | 7/2019 | Socher et al. | |
| 2019/0251168 A1 | 8/2019 | McCann et al. | |
| 2019/0251431 A1 | 8/2019 | Keskar et al. | |
| 2019/0258714 A1 | 8/2019 | Zhong et al. | |
| 2019/0258939 A1 | 8/2019 | Min et al. | |
| 2019/0286073 A1 | 9/2019 | Hosseini-Asl et al. | |
| 2019/0295530 A1 | 9/2019 | Hosseini-Asl et al. | |
| 2019/0311227 A1 * | 10/2019 | Kriegman | G06K 9/6273 |
| 2019/0362020 A1 | 11/2019 | Paulus et al. | |
| 2019/0362246 A1 | 11/2019 | Lin et al. | |

OTHER PUBLICATIONS

Devlin et al., "BERT: Pre-training of Deep Bidirectional Transformers for Language Understanding," arXiv preprint arXiv:1810.04805, pp. 1-14, 2018.

Ebrahimi et al., "Hotflip: White-Box Adversarial Examples for Text Classification," arXiv preprint arXiv:1712.06751, pp. 1-9, 2017.

Gao et al., Black-Box Generation of Adversarial Text Sequences to Evade Deep Learning Classifiers, arXiv preprint arXiv:1801,04354v1, pp. 1-7, 2018.

Li et al., "Textbugger: Generating Adversarial Text Against Real-world Applications," arXiv preprint arXiv:1812.05271, pp. 1-15, 2018.

Liang et al., "Deep Text Classification Can Be Fooled," arXiv preprint arXiv:1704.08006, pp. 1-7, 2017.

Pennington et al., "GloVe: Global Vectors for Word Representation," In Proceedings of the 2014 Conference on Empirical Methods in Natural Language Processing (EMNLP), pp. 1532-1543 2014.

Peters et al., "Deep Contextualized Word Representations," arXiv preprint arXiv: 1802.05365, pp. 1-15, 2018.

Ribeiro et al., Semantically Equivalent Adversarial Rules for Debugging NLP Models. In Proceedings of the 56th Annual Meeting of the Association for Computational Linguistics (vol. 1: Long Papers), pp. 856-865 2018.

Sato et al., "Interpretable Adversarial Perturbation in Input Embedding Space for Text," arXiv preprint arXiv:1805.02917, pp. 1-8, 2018.

Zhao et al., "Generating Natural Adversarial Examples," arXiv preprint arXiv:1710.11342, pp. 1-12, 2017.

\* cited by examiner

430

Input: Original document $x$ and its ground truth label $y$, classifier $f(\cdot)$, budget $K$
Output: True or False 1. initialization $x_{best} \leftarrow x; i \leftarrow 0$;
2. while $i < K$ do
3.     $c \leftarrow Segmentation(x_{best})$;
4.     for each component $c$ in $c$ do
5.         Compute gradients $\mathcal{G}$ of component $c$ according to Eq.1 ;
6.     end
7.     Find the component $c$ with largest or smallest gradient norm;
8.     $word \leftarrow BackTrackToWord(c)$;
9.     $typos \leftarrow NaturalTypo(word)$;
10.     $score_h \leftarrow -1$;
11.     for each typo in typos do
12.         Generate $x_{typo}$ by replacing word as typo in $x_{best}$;
13.         $y', score \leftarrow f(x_{best})$;
14.         if $y \neq y'$ then
15.             return $True$
16.         end
17.         if $score > score_h$ then
18.             $x_{best} \leftarrow x_{typo}$
19.         end
20.     end
21.     $i \leftarrow i + 1$;
22. end
23. Return False;

*FIG. 4C*

| | K | Max-grad | Min-grad | Random |
|---|---|---|---|---|
| 502 → | 0 | | 92.9 | |
| 504 → | 1 | 70.3 | 91.7 | 86.1±0.8 |
| 506 → | 2 | 62.3 | 90.4 | 80.6±0.4 |
| 508 → | 3 | 57.5 | 89.0 | 74.8±1.1 |
| 510 → | 4 | 54.1 | 88.1 | 67.1±0.8 |
| 512 → | 5 | 53.6 | 87.2 | 60.8±0.5 |
| 514 → | 6 | 53.1 | 85.7 | 56.8±0.5 |
| 516 → | 7 | 53.0 | 84.9 | 51.6±0.5 |
| 518 → | 8 | 53.0 | 84.4 | 47.1±0.3 |
| 520 → | 9 | 53.0 | 84.1 | 42.2±0.9 |
| 522 → | 10 | 53.0 | 83.9 | 39.3±1.4 |

*FIG. 5*

| | K | Max-grad | Min-grad | Random |
|---|---|---|---|---|
| 602 → | 1 | 15.9 | 19.8 | 20.0 |
| 604 → | 2 | 15.8 | 28.7 | 33.4 |
| 606 → | 3 | 25.1 | 33.4 | 39.9 |
| 608 → | 4 | 20.8 | 38.7 | 44.2 |
| 610 → | 5 | 18.8 | 41.3 | 45.6 |

| K | Glove+char | Glove | BERT |
|---|---|---|---|
| 0 | 85.7 | 85.4 | 92.9 |
| 1 | 79.8 | 79.0 | 70.3 |
| 2 | 77.5 | 77.2 | 62.3 |
| 3 | 76.7 | 76.6 | 57.5 |
| 4 | 76.3 | 75.9 | 54.1 |
| 5 | 76.4 | 75.8 | 53.6 |

*FIG. 7*

| K | Max-grad | Min-grad | Random |
|---|---|---|---|
| 0 | | 80.4, 88.2 | |
| 1 | 23.6, 45.9 | 41.8, 67.6 | 35.6, 60.5 |

*FIG. 8*

ROBUSTNESS EVALUATION VIA NATURAL TYPOS

RELATED APPLICATIONS

This application claims priority to U.S. Provisional Patent Application No. 62/851,073 filed May 21, 2019, which is incorporated by reference herein in its entirety.

TECHNICAL FIELD

The present disclosure relates generally to neural networks and deep learning models, and in particular, to robustness evaluation of a model via "natural" typos.

BACKGROUND

Artificial intelligence, implemented with neural networks and deep learning models, has demonstrated great promise as a technique for automatically analyzing real-world information with human-like accuracy. In general, such neural network and deep learning models receive input information and make predictions based on the input information. Natural language processing (NLP) is one class of problems to which neural networks may be applied.

In the real world, NLP models will encounter or be exposed to "noisy" texts that contain spelling or typographical errors. These errors are often the result of mistakes by a human user, for example, when interacting with an interface such as keyboard on a computer, smart phone, tablet, etc. Even a small typographical error may confuse the best NLP models, which leads to the question: "How robust is a given neural network model with respect to natural typos?"

Accordingly, it would be advantageous to have systems and methods that can evaluate the robustness of an NLP model, for example, when faced with typographical errors related to the interaction of a human user with a keyboard.

BRIEF DESCRIPTION OF THE DRAWINGS

FIG. 4C is a pseudo code of an example algorithm implementing the method of FIG. 4B or a portion thereof according to some embodiments.

FIG. 5 is a table illustrating robustness evaluation results for a neural network model using natural typos according to some embodiments.

FIG. 6 is a table illustrating human readability on typo-injected text generated during the robustness evaluation of FIG. 5 according to some embodiments.

FIG. 7 is a table illustrating comparison of robustness evaluation results for different network models using natural typos according to some embodiments.

FIG. 8 is a table illustrating robustness evaluation results for a neural network model for a question answer task using natural typos.

In the figures, elements having the same designations have the same or similar functions.

DETAILED DESCRIPTION

Artificial intelligence, implemented with neural networks and deep learning models, has demonstrated great promise as a technique for automatically analyzing real-world information with human-like accuracy. In general, such neural network and deep learning models receive input information and make predictions based on the input information. Natural language processing (NLP) is one class of problems to which neural networks may be applied.

The current state-of-the-art neural network models for different NLP tasks are trained and evaluated on fixed benchmark datasets. These fixed datasets are typically free of spelling or typographical errors. When deploying NLP models in the real-world, however, the models will encounter "noisy" texts that contain errors, often due to human or user-generated mistakes, e.g., character substitution, additional, and/or missing characters.

How to fairly evaluate the robustness of the models with respect to user-generated noisy text is an open question. One of the most common interfaces for text input is keyboard, and the input text often includes typographically errors made by a human user when interacting with a keyboard interface.

According to some embodiments, the present disclosure provides systems and methods to evaluate the robustness of NLP models via natural typos.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Figure 1:
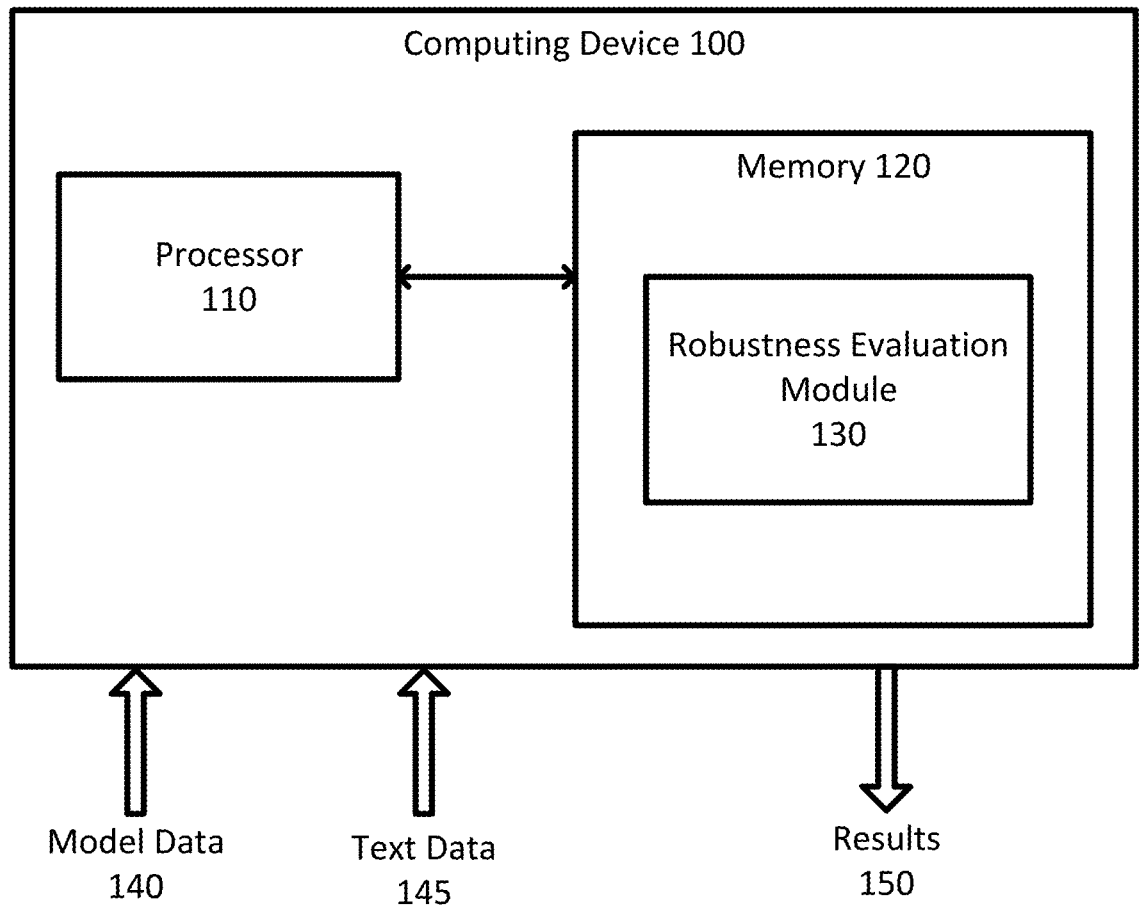
FIG. 1 is a simplified diagram of a computing device according to some embodiments.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a robustness evaluation module 130 that may be used to implement and/or emulate the systems and models, and/or to implement any of the methods described further herein. In some examples, robustness evaluation module 130 may be used to evaluate the robustness of one or more NLP models via natural typos (e.g., keyboard typos for human-typed input documents). In some examples, memory 120 may include non-transitory, tangible, machine readable media that includes executable code that when run by one or more processors (e.g., processor 110) may cause the one or more processors to perform the methods described in further detail herein. In some examples, robustness evaluation module 130 may be implemented using hardware, software, and/or a combination of hardware and software.

As shown, computing device 100 receives as input model data 140 and text data 145, which are provided to robustness evaluation module 130. The model data 140 may comprise information about one or more target models to be evaluated. Each target model may perform one or more NLP tasks, such as, for example, text classification, text compression, question answering, etc. For each such target model, the model data 140 may include information for the model architecture and all necessary parameters. The text data 145 may relate to or comprise text for one or more documents to be provided to and processed by the target models. In some embodiments, the robustness evaluation module 130 may generate one or more errors (e.g., mimicking keyboard typos) that are inserted into or replaces text in the one or more documents of the text data 145. The robustness evaluation module 130 operates on the input model data 140 and text data 145 (with added keyboard typos) to evaluate the robustness of a pre-trained target model for one or more NLP tasks, such as, for example, text classification. The module 130 develops, derives, or generates results which are indicative of the model's robustness with respect to the keyboard typos. The results are provided as output 150 from computing device 100.

Figure 2:
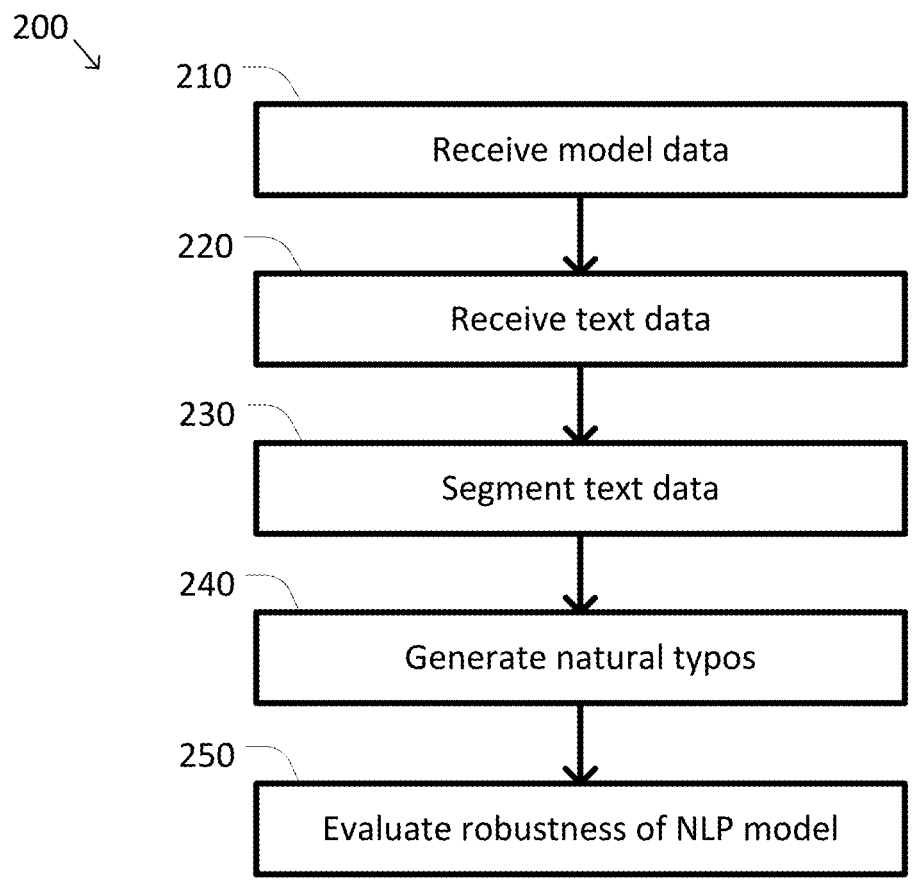
FIG. 2 is a simplified diagram of a method for evaluating the robustness of an NLP model via natural typos, according to some embodiments.

FIG. 2 is a simplified diagram of a method 200 for evaluating the robustness of an NLP model via natural typos (e.g., keyboard typos for human-typed input documents), according to some embodiments. One or more of the processes 210-250 of method 200 may be implemented, at least in part, in the form of executable code stored on non-transitory, tangible, machine-readable media that when run by one or more processors may cause the one or more processors to perform one or more of the processes 210-250. In some embodiments, method 200 may correspond to the method used by robustness evaluation module 130 to develop, derive, or generate results which are indicative of the model's robustness with respect to the natural typos. It is noted that while in the example below, keyboard typos are used as examples for natural typos for human-typed input documents, various types of typos may be used for various types of input documents (e.g., OCRed input documents).

At a process 210, model data 140 relating to one or NLP models is received. Each NLP model may perform one or more NLP tasks, such as, for example, text classification, text compression, question answering, etc. In some examples, for each model, the model data 140 may include information for the model architecture and all necessary parameters.

At a process 220, text data 145 is received. In some examples, the text data 145 may relate to or comprise text for one or more documents to be provided to and processed by the target models, according to their respective NLP tasks.

At a process 230, robustness evaluation module 130 segments the text data for the one or more documents into the word/sub-word/character as basic components. The module 130 then identifies one or more key words (most informative or uninformative words) from these basic components.

At a process 240, one or more natural typos are generated though manipulation of the key words. In some examples, the natural typos are generated based on natural typo rules generated based on the particular NPL task and/or source of the input document (e.g., input document typed by humans, input document from optical character recognition (OCR), etc.). In an example where the input document is typed by humans, the natural typo rules provide that the natural typos include keyboard typos, which that are natural in human-typed input documents. Such keyboard typos may be generated using keyboard typo rules, and example keyboard typos include the following kinds of keyboard typos:

(1) Insertion: Insert characters or spaces into the word, such as "oh!"←"ooh!".
(2) Deletion: Delete a random character of the word because of fast typing, such as "school"←"schol".
(3) Swap: Randomly swap two adjacent characters in a word.
(4) Pronounce: Wrongly typing due to close pronunciation of the word, such as "egg"←"agg".
(5) Replace-W: Replace the word by the frequent human behavioral keyboard typo (e.g., based on the known statistics) and/or the keyboard layout.

One or more of these keyboard typos are inserted into or used to replace text in the input document.

At a process 250, robustness evaluation module 130 evaluates the robustness of the pre-trained NLP model, e.g., for text classification, in view of the added keyboard typos mimicking human generated mistakes. In some embodiments, the input document with added keyboard typos is provided as input to the target NLP model. The target model is run or operated in its normal way to perform the NLP task on the input document with keyboard typos, and the results or predictions of the model from this task are saved. Robustness evaluation module 130 analyzes the results or predictions of the target NLP model to evaluate the model's robustness. The results of such evaluation are provided as output 150 from robustness evaluation module 130.

Figure 3:
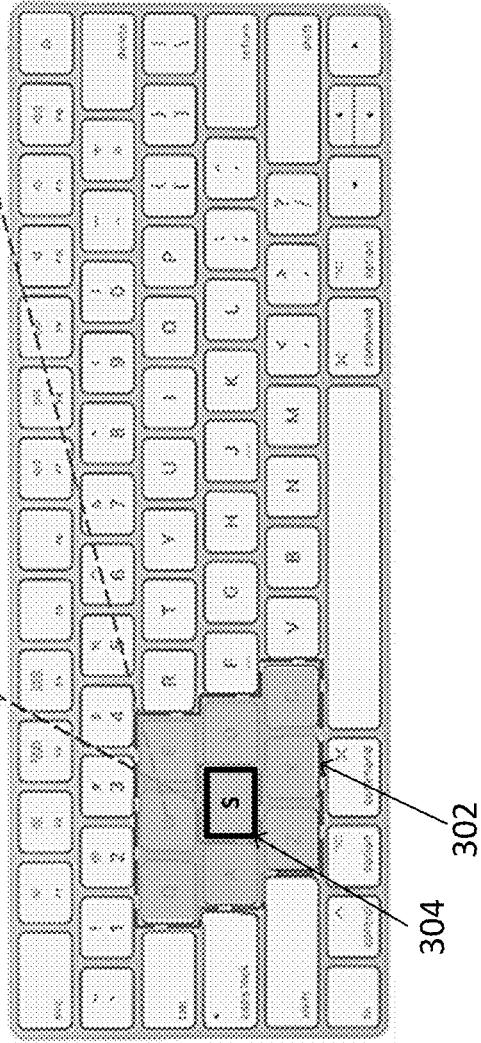
FIG. 3 is a simplified diagram illustrating generating a natural keyboard typo according to some embodiments.

Referring to FIG. 3, illustrated is a simplified diagram of how a natural typo may be generated based on a keyboard typo rule that replace the word by the frequent human behavioral keyboard typo (e.g., based on the known statistics) and/or the keyboard layout. As shown in FIG. 3, a possible wrongly tying area 302 of a keyboard 300 is identified based on an original (correct) character 304. For example, for an original character 304 that is "S" on the keyboard 300, a possible wrongly tying area 302 is determined and include all characters immediately adjacent to "S," which includes "Q," "W," "E," "A," "D," "Z," "X," and "C." In an example, a natural typo "why" is generated for "shy" based on the particular keyboard typo rule, by replaying "s" in the original word with "w."

Referring to FIG. 4, a method 400 for determining a neural network model for performing a NPL task based on model robustness evaluation via natural typos is illustrated. The method 400 begins at block 402, where a NPL task (e.g., text classification, text compression, question answering, etc.) and an input document type (e.g., a human-typed input document, an OCRed input document, an audio-transcribed input document, etc.).

The method 400 may proceed to block 404, where one or more natural typo generation rules are determined for the NPL task, e.g., for generating typos that are natural for the particular input document type. In an example, for a human-typed input document, natural typo generation rules provide how to generate natural keyboard typos, mimicking human keyboard typos. In another example, for an OCRed input document, natural typo generation rules provide how to generate natural OCR typos, mimicking OCR typos.

The method 400 may proceed to block 406, where robustness evaluation is performed to one or more target neural network models to be evaluated based on the natural typo generational rules, and robustness evaluation results (e.g., each including a max-gradient result, a min-gradient result, and a random modification result) are generated. In some embodiments, at block 406, the method 200 of FIG. 2 is performed to generate robustness evaluation results for each of the target neural network models. In some embodiments, at block 406, a robustness evaluation is performed on each neural network model using methods as described in detail below with reference to FIGS. 4B and 4C.

The method 400 may proceed to block 408, where a neural network model is determined based on the robustness evaluation results. In some embodiments, the neural network model is selected from the one or more target neural network models based on the corresponding robustness evaluation results. In an example, the neural network model is selected based on a best max-gradient robustness result (e.g., highest max-gradient robustness accuracy for a particular budget (e.g., K=4)), a best min-gradient robustness result (e.g., highest min-gradient robustness accuracy for a particular budget (e.g., K=4)), the random modification robustness result, any other suitable robustness result, and/or a combination thereof.

In some embodiments, block 408 includes process 410, where a segmentation method for generating components by segmenting the text data from the document is determined, based on the robustness results. In an example, a segmentation method that generates the same number of tokens for the original word and the modified word with injected natural typos may be used.

In some embodiments, block 408 includes process 412, where parameters of the selected neural network model may be further trained based on the robustness evaluation results and/or the injected natural typos.

The method 400 may then proceed to block 414, where the determined neural network model is used to perform the NPL task.

Figure 4A:
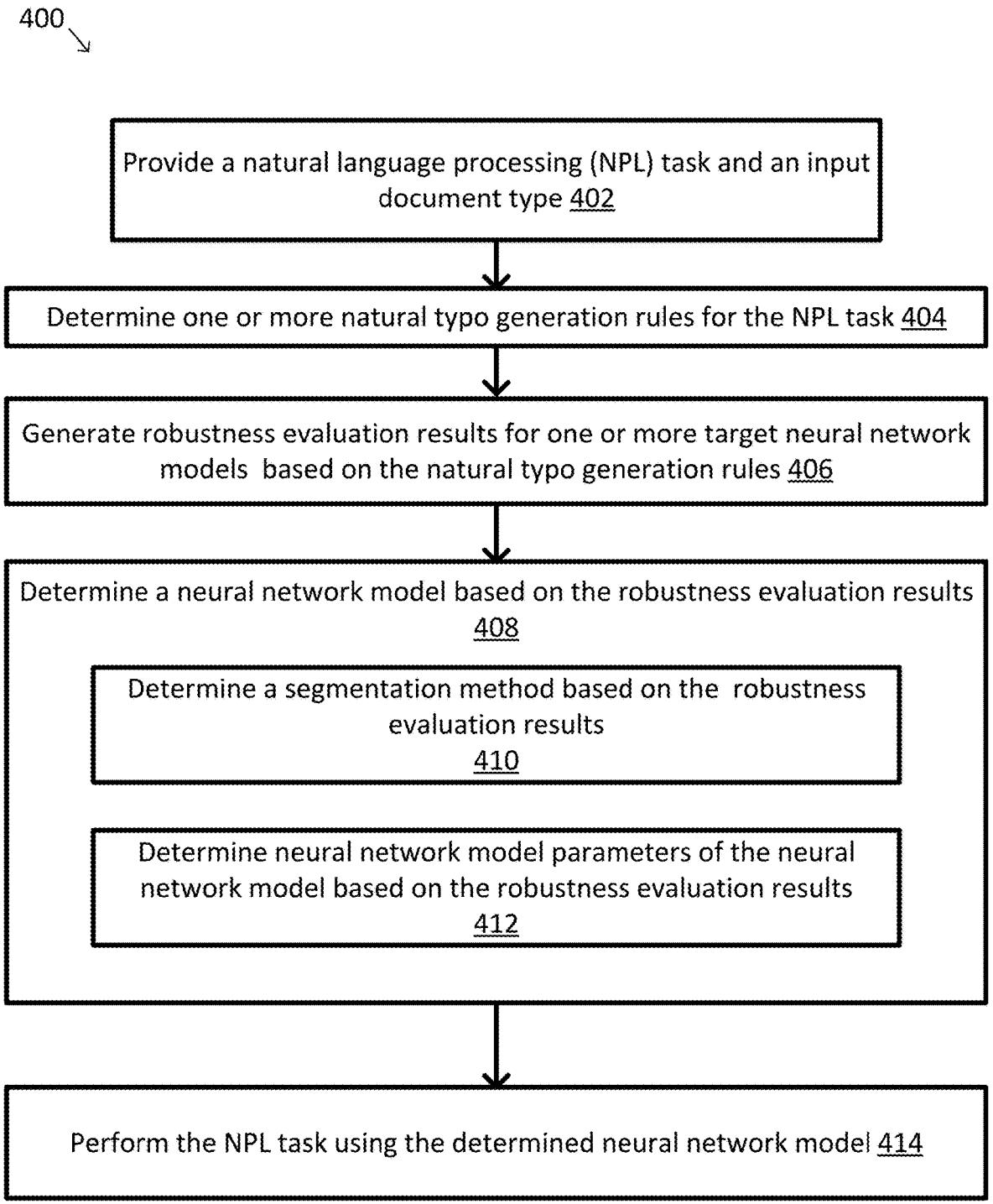
FIG. 4A is a simplified diagram of a method for determining a neural network model for performing a NPL task based on model robustness evaluation via natural typos, according to some embodiments.
Figure 4B:
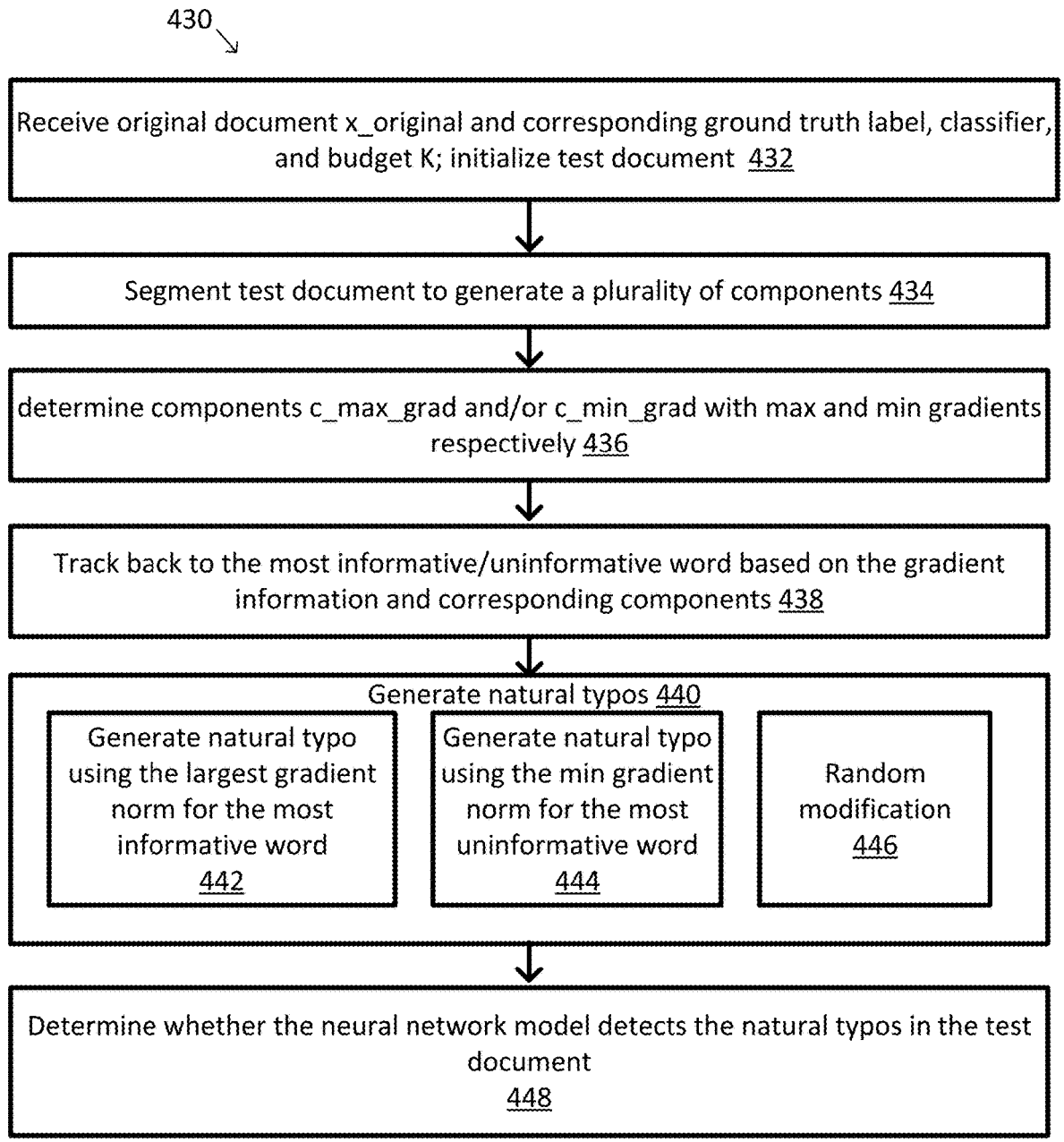
FIG. 4B is a simplified diagram of a method for robustness evaluation using natural typo used in the method of FIG. 4A.

Referring to FIGS. 4B and 4C, an example method 430 (e.g., method 406 of FIG. 4A) for robustness evaluation using natural typo and pseudo code of an example algorithm implementing the method 430 or a portion thereof are illustrated in FIGS. 4B and 4C respectively. As discussed in detail below, in order to obtain a complete picture of the robustness of a particular neural network model on typos, the robustness result is provided by combining different gradient information (e.g., maximum gradient, minimum gradient) with keyboard-constrained types. Different with adversarial attacks such that adversaries want to expose the worst-case vulnerabilities of the neural network model, the method 430 evaluates the robustness of the model with respect to natural keyboard typos by the largest (max) gradient norm (e.g. adversarial attacks setting), smallest (min) gradient, and random modification.

The method 430 may start at block 432 (e.g., line Input of FIG. 4C), where an original document and its corresponding ground truth label are received as the baseline for accuracy evaluation. A classifier f for the neural network model to be evaluated is also received. A budget K indicating a limitation of the number of typos in a single document is also received. While it could be more than one typo in each document though keyboard in real life, it may not be natural to have lots of typos in a single document for a particular size. As such, the budget K is provided as the limitation of the number of typos in a document.

As shown in line Output of FIG. 4C, the method 430 may generate a typo evaluation result (e.g., true or false indicating whether a natural typo is detected) as an output. In some embodiments, the method 430 may also receive natural typo generation rules for generating the natural typos for the particular NLP task and/or type of input documents. In one example for human-typed input documents, the natural typo generation rules provide how to generate natural typos by simulating human keyboard typos for neural network model evaluation. At block 430, the method 430 may initialize a test document with the original document, and initialize a typo count i with 0 (e.g., line 1 of FIG. 4C).

The method 430 may proceed to block 434, where the test document is segmented to generate a plurality of components (e.g., line 3 of FIG. 4C). In an example, the test document is segmented into words (or subwords) $c=(c_1, c_2, \ldots, c_N)$, where $c_i$ is the i-th component, and N is the test length.

The method 430 may then proceed to block 436, where components c_max_grad determine components c_max_grad and c_min_grad with max and min gradients respectively (e.g., lines 4-7 of FIG. 4C). In an example, partial derivative (e.g., gradient G) of each component $c_i$ is determined based on the predicted class y as follows:

$$\mathcal{G}_f(c_i) = \nabla_{c_i} \mathcal{L}(c_i, y), \qquad (1)$$

where $L(c_i, y)$ denote the loss with respect to $c_i$ with its ground truth label y. Components c_max_grad and c_min_grad with maximum and minimum gradients G may be determined based on the computed gradients for all components c.

The method 430 may then proceed to block 438, where the most informative/uninformative word is tracked back based on components c_max_grad/c_min_grad and the corresponding gradient information (e.g., line 8 of FIG. 4C). The method 430 may proceed to block 440, where natural typos are generated for these most informative/uninformative words (e.g., line 9 of FIG. 4C) (e.g., based on the natural typo generation rules for a particular NPL task/input document type). Block 440 may include block 442, where a natural typo is generated for the most informative word with the largest gradient norm. Block 440 may include block 444, where a natural typo is generated for the most uninformative word with the smallest gradient norm. Block 440 may include block 446, where a natural typo is generated based on random modification of a random word of the test document.

The method 430 may proceed to block 448, where it is determined whether the neural network model detects the natural typo(s) generated at block 440 (e.g., lines 10-21 of FIG. 4C). In an example, for each natural typo, it may change the neural network model prediction f(x_typo), and if the prediction for a test document with the typo is different from the ground truth label y without the typo, the natural typo is correctly detected.

The method 430 may be repeated on a number of documents, and the combined evaluation results may provide a more complete picture of the robustness of a particular neural network model on typos, including robustness for max-gradient typos, min-gradient typos, and random modification typos respectively. Some example robustness evaluation results are illustrated below with reference to FIGS. 5-8, where examples of various configurations for the evaluation system and evaluation results thereof are illustrated.

Referring FIG. 5, illustrated is a table 500 including evaluation results 502 through 522 from robustness evaluation of a neural network model. Specifically, robustness evaluation is performed to a fine-tuned Bidirectional Encoder Representations from Transformers (BERT) model for a text classification task, where the input documents are human-typed input documents. The robustness evaluation uses the training set of Stanford Sentiment Treebank (SST), where the method is verified using a development set (e.g., 872 examples), and is applied in to a test set (1,822 examples). The evaluation sets contain sentence level inputs, and the outputs are binary labels. The test set accuracy is 93.8%. Each evaluation result includes a budget K 524, a max-gradient result 526, a min-gradient result 528, and a random modification result 530.

Specifically, a bert-base-uncased configuration for the BERT model is used, where the BERT model includes a 12-layerd pre-trained BERT on lower-cased text. In some embodiments, during the segmentation process, simple white space tokenization is performed, followed by a Wordpiece tokenization. For example, a word can be split into subword tokens (e.g. adversarial→[ad, ##vers, ##aria, ##1], robustness→[robust, ##ness]). In some examples, special symbols (e.g., "##") to handle the subwords are not considered or omitted when injecting typos. An example typo for "##ness" is "##nesss", and "robust" and "##nesss" are concatenated together to form a new word "robustnesss." The new word is split again into subwords [robust, ##ness, ##s]. As such, in the particular example, the typo affects the subword tokenization, where the original word subword tokenization generates two subword tokens ([robust, ##ness]) to three subword tokens (e.g., [robust, ##ness, ##s]). In some examples, typos are not injected to special tokens (e.g., [CLS] and [SEP] in BERT) in the model that are not actual input words.

In the example of FIG. 5, as shown in column 524, the NLP model of the evaluation system is sensitive to the typos on words with the largest gradient norms. For example, as shown in row 504, injecting only single typo (with a budget K=1) degrades the accuracy by 22.6% (e.g., from 92.9% in 502 to 70.3% in 504). As such, the evaluation results confirm that the gradient norm is a strong indicator to find task-specific informative words. As shown in rows 512 through 522, accuracy converges to almost the chance-level accuracy (i.e. around 50%). In the particular evaluation system as shown in FIG. 5, after K=7, any typos in the words with the largest gradient norms do not make the model predictions worse.

Furthermore, in the example of FIG. 5, the evaluation results show that the NLP model is not sensitive to the typos in words with the smallest gradient norms. As shown in column 528 of table 500, even with K=10, the accuracy drop is only 9% (e.g., from 92.9% of row 502 to 83.9% of row 522). As such, the evaluation results provide that the NPL model is robust to such typos. In other words, it may be determined that the model may ignore such information during the classification process, without significantly affecting the performance.

As shown in FIG. 5, each evaluation result also includes random modification results, as shown in column 530 of table 500. In the particular example, where the random modification uses standard deviations over five different random seeds, the accuracy drops when K increases from 1 to 10. In various embodiments, the random modification results may be used to indicate/estimate the robustness of the model when people randomly make some typo mistakes. The budget K may be used as a hyper parameter to estimate the number of random typo mistakes.

Referring to FIG. 6, human readability on typo-injected text is analyzed on the evaluation system used in FIG. 5. As various typos are generated in the evaluation system of FIG. 5, some typos are easier to be recognized by humans, while other typos are not so easily recognized by humans. In the human readability analysis, multiple persons (e.g., 10 persons) are asked to read and detect typos in the examples (e.g., 100 examples) used in the evaluation system of FIG. 5. In some example, human review time is limited (e.g., 3 seconds for each sentence). The results from the multiple persons may be then averaged to generate the average human detected typo counts. As shown in FIGS. 5 and 6, for K from 1 through 5, while the model is sensitive to the max-grad setting as shown in FIG. 5 (e.g., rows 504 through 512 of table 500 of FIG. 5), humans are less sensitive (e.g., rows 602 through 610 of table 600 of FIG. 6 showing less change in accuracy).

On the other hand, as shown in FIGS. 5 and 6, while the model is less sensitive to the min-grad setting as shown in FIG. 5, the min-grad setting is more affective to humans. This may be explained that the min-grad setting often injects the typos into function words, and as a result, short words, such as "the" and "it", are modified. These typos in function words are more visible to humans. Here is an example: "ut's a charming and often affecting journey," where "it" is modified to "ut". This typo looks strange to humans, but the model prediction did not change.

As humans and the model are sensitive to the different typos (or words), the model's robustness may be improved by selecting a subword segmenetation method more robust to the typos. For example, a max-grad method may modify the keyword "inspire" to "inspird" in the following sentence: "a subject like this should inspire reaction in its audience; the pianist does not." A first subword segmentation method, "inspird" is split into [ins, ##pi, ##rd], which is completely different from the original string. A second subword segmentation method may segment "inspird" into [ins, ##pird], which is more similar to the original string. As such, in some embodiments, the second subword segmentation method may be selected to provide a more robust model.

Referring to FIG. 7, transferability of the typo effects is analyzed on evaluation systems using different neural network models. As shown in FIG. 7, in addition to the BERT model used in FIG. 5, two other RNN-based classifiers with the Glove embeddings and character n-gram embeddings respectively are evaluated by the evaluation system. Table 700 of FIG. 7 illustrates the max-grad setting evaluation results 704 through 712 with K=0 through 5 for Globe+char model 714, Glove model 716, and BERT model 718, using BERT-based typos. The BERT model 718 is the same model used in the evaluation system of FIG. 5. As shown in table 700, the BERT-based typos also degrade the scores of the RNN-based models 714 and 716, and the character information (e.g., with the Glove embeddings, character n-gram embeddings) makes the corresponding model slightly more robust.

Referring to FIG. 8, in some embodiments, the evaluation system and method are applied to another task, question answering task, on the SQuAD v1.1 dataset. First, the BERT model is fine-tuned using the SQuAD training set. In some embodiments, the input to the model is the concatenation of a question and its supporting paragraph. For the question answering task, in some examples, typos are injected into the questions, but not the answers. The development set accuracy is 80.4% Exact Match (EM), and 88.2% F1, as shown in row 802 of table 800 where K=1. As shown in row 804 of table 800 where K=1, the degrading results by the typos are consistent with those in FIG. 5. It is noted that for some question answering models, only single typo (where K=1) appears to degrade the model performance significantly, while multi-typos (e.g., K greater than 1) do not appear to degrade the model performance significantly (e.g., by decreasing accuracy by more than 5%). In terms of the transferability, the ELMo-based SQuAD model is also evaluated, and the single typos with the max-grad setting degrades the EM and F1 scores from 71% and 80%, to 56% and 66%, respectively.

In various embodiments, the evaluation system and method may be used to evaluate different neural network models, and the robustness evaluation results provide their different sensitivities to different types of words (e.g., max-gradient typo, min-gradient typo, random-modification typo, etc.). As such, the robustness evaluation results may be used to select particular neural network models for performing particular tasks (e.g., NLP tasks, question answering tasks, scanned document processing tasks, human-typed document processing tasks, etc.) based on performance (e.g., accuracy, computing resources, etc.) requirements. Furthermore, the robustness evaluation results may also be used to further train the particular neural network model, such that the neural network model has improved performance for that particular task.

Some examples of computing devices, such as computing device 100 may include non-transitory, tangible, machine readable media that include executable code that when run by one or more processors (e.g., processor 110) may cause the one or more processors to perform the processes of methods 200, 400, and 450. Some common forms of machine readable media that may include the processes of methods 200, 400, and 450 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for evaluating robustness of one or more target neural network models, comprising:
   receiving one or more natural typo generation rules associated with a first task associated with a first input document type;
   receiving a first target neural network model;
   receiving a first document and corresponding ground truth labels;
   generating one or more natural typos for the first document based on the one or more natural typo generation rules, using gradient information of components of the first document, wherein the generating the one or more natural typos include:
      segmenting the first document to generate a plurality of sub-word components;
      generating gradient information for the plurality of sub-word components; and
      generating the one or more natural typos based on the gradient information;
   providing, to the first target neural network model, a test document generated based on the first document and the one or more natural typos as an input document to generate a first output; and
   generating a robustness evaluation result of the first target neural network model based on a comparison between the output and the ground truth labels.

2. The method of claim 1, wherein the first input document type includes human-typed documents, and
   wherein the one or more natural typo generation rules are configured to generate typos mimicking human keyboard typos.

3. The method of claim 1, wherein the generating the one or more natural typos based on the gradient information includes:
   determining a first sub-word component having one of a maximum gradient and a minimum gradient based on the gradient information;

determining a first word of the first document based on the first sub-word component; and generating a first natural typo based on the first word.

4. The method of claim 3, wherein the generating the one or more natural typos based on the gradient information includes:

determining a second sub-word component having the other of the maximum gradient and the minimum gradient based on the gradient information;

determining a second word of the first document based on the second sub-word component; and generating a second natural typo based on the second word.

5. The method of claim 4, wherein the generating the one or more natural typos include:

determining a third word of the first document randomly; and generating a third natural typo based on the third word.

6. The method of claim 3, wherein the robustness evaluation result of the first target neural network model includes:

a first model evaluation accuracy based on natural typos generates based on the maximum gradient information; and a second model evaluation accuracy based on natural typos generates based on the minimum gradient information.

7. A non-transitory machine-readable medium comprising a plurality of machine-readable instructions which, when executed by one or more processors, are adapted to cause the one or more processors to perform a method comprising:

receiving one or more natural typo generation rules associated with a first task associated with a first input document type;

receiving a first target neural network model;

receiving a first document and corresponding ground truth labels;

generating one or more natural typos for the first document based on the one or more natural typo generation rules, using gradient information of components of the first document, wherein the generating the one or more natural typos include:

segmenting the first document to generate a plurality of sub-word components;

generating gradient information for the plurality of sub-word components; and generating the one or more natural typos based on the gradient information;

providing, to the first target neural network model, a test document generated based on the first document and the one or more natural typos as an input document to generate a first output; and generating a robustness evaluation result of the first target neural network model based on a comparison between the output and the ground truth labels.

8. The non-transitory machine-readable medium of claim 7, wherein the first input document type includes human-typed documents, and wherein the one or more natural typo generation rules are configured to generate typos mimicking human keyboard typos.

9. The non-transitory machine-readable medium of claim 7, wherein the generating the one or more natural typos based on the gradient information FAX (949) 202-3001 includes:

determining a first sub-word component having one of a maximum gradient and a minimum gradient based on the gradient information;

determining a first word of the first document based on the first sub-word component; and generating a first natural typo based on the first word.

10. The non-transitory machine-readable medium of claim 9, wherein the generating the one or more natural typos based on the gradient information includes:

determining a second sub-word component having the other of the maximum gradient and the minimum gradient based on the gradient information;

determining a second word of the first document based on the second sub-word component; and generating a second natural typo based on the second word.

11. The non-transitory machine-readable medium of claim 10, wherein the generating the one or more natural typos include:

determining a third word of the first document randomly; and generating a third natural typo based on the third word.

12. The non-transitory machine-readable medium of claim 9, wherein the robustness evaluation result of the first target neural network model includes:

a first model evaluation accuracy based on natural typos generates based on the maximum gradient information; and a second model evaluation accuracy based on natural typos generates based on the minimum gradient information.

13. A system, comprising:

a non-transitory memory; and one or more hardware processors coupled to the non-transitory memory and configured to read instructions from the non-transitory memory to cause the system to perform a method comprising:

receiving one or more natural typo generation rules associated with a first task associated with a first input document type;

receiving a first target neural network model;

receiving a first document and corresponding ground truth labels;

generating one or more natural typos for the first document based on the one or more natural typo generation rules, using gradient information of components of the first document, wherein the generating the one or more natural typos include:

segmenting the first document to generate a plurality of sub-word components;

generating gradient information for the plurality of sub-word components; and generating the one or more natural typos based on the gradient information;

providing, to the first target neural network model, a test document generated based on the first document and the one or more natural typos as an input document to generate a first output; and generating a robustness evaluation result of the first target neural network model based on a comparison between the output and the ground truth labels.

14. The system of claim 13, wherein the first input document type includes human-typed documents, and wherein the one or more natural typo generation rules are configured to generate typos mimicking human keyboard typos.

15. The system of claim 14, wherein the generating the one or more natural typos based on the gradient information includes:

determining a first sub-word component having one of a maximum gradient and a minimum gradient based on the gradient information;

determining a first word of the first document based on the first sub-word component; and generating a first natural typo based on the first word.

16. The system of claim 15, wherein the generating the one or more natural typos based on the gradient information includes:

determining a second sub-word component having the other of the maximum gradient and the minimum gradient based on the gradient information;

determining a second word of the first document based on the second sub-word component; and generating a second natural typo based on the second word.

17. The system of claim 15, wherein the robustness evaluation result of the first target neural network model includes:

a first model evaluation accuracy based on natural typos generates based on the maximum gradient information; and a second model evaluation accuracy based on natural typos generates based on the minimum gradient information.

* * * * *